(12) United States Patent
Marabito

(10) Patent No.: US 11,135,736 B2
(45) Date of Patent: Oct. 5, 2021

(54) BELT FORMING SYSTEM

(71) Applicant: THE STEELASTIC COMPANY, LLC, Cuyahoga Falls, OH (US)

(72) Inventor: Mark Marabito, Medina, OH (US)

(73) Assignee: THE STEELASTIC COMPANY, LLC, Cuyahoga Falls, OH (US)

( * ) Notice: Subject to any disclaimer, the term of this patent is extended or adjusted under 35 U.S.C. 154(b) by 133 days.

(21) Appl. No.: 15/548,029

(22) PCT Filed: Feb. 2, 2016

(86) PCT No.: PCT/US2016/016135
§ 371 (c)(1),
(2) Date: Aug. 1, 2017

(87) PCT Pub. No.: WO2016/126684
PCT Pub. Date: Aug. 11, 2016

(65) Prior Publication Data
US 2018/0243933 A1  Aug. 30, 2018

Related U.S. Application Data

(60) Provisional application No. 62/112,991, filed on Feb. 6, 2015.

(51) Int. Cl.
*B26D 7/06* (2006.01)
*B29D 30/42* (2006.01)
(Continued)

(52) U.S. Cl.
CPC .......... *B26D 7/0625* (2013.01); *B26D 1/085* (2013.01); *B26D 3/003* (2013.01); *B26D 7/18* (2013.01);
(Continued)

(58) Field of Classification Search
CPC ................... B29D 30/30; B29D 30/42; B29D 2030/4493; B29D 30/1657;
(Continued)

(56) References Cited

U.S. PATENT DOCUMENTS 6,355,126 B1 * 3/2002 Ogawa ............... B29D 30/1657
156/117
2002/0062908 A1 * 5/2002 Mancini ............ B29D 30/3007
156/130
(Continued)

FOREIGN PATENT DOCUMENTS

CN  101304871 A  11/2008
CN  102947979 A  2/2013
(Continued)

OTHER PUBLICATIONS

Inman, R Anthony. Layout. Reference for Business. Jun. 11, 2006 (accessed from https://www.referenceforbusiness.com/management/Int-Loc/Layout.html on Oct. 31, 2020). (Year: 2006).*
(Continued)

*Primary Examiner* — Katelyn W Smith
*Assistant Examiner* — Alexander D Booth
(74) *Attorney, Agent, or Firm* — Crowell & Moring LLC

(57) ABSTRACT

A belt forming system may include an upstream conveyor, a downstream conveyor located downstream of the upstream conveyor, and a belt assembly system in communication with the upstream conveyor and the downstream conveyor. The belt assembly system may also include an arm, an actuator for moving the arm, and/or a holding component coupled to the arm and adapted to move a strip section from the upstream conveyor to a desired position on the downstream conveyor such that the strip section is oriented at a predetermined angle on the downstream conveyor. In one embodiment, the belt forming system comprises a belt
(Continued)

cutter. The present disclosure also relates to a method for manufacturing at least a portion of a tire belt.

14 Claims, 2 Drawing Sheets

(51) Int. Cl.
*B29D 30/46* (2006.01)
*B26D 1/08* (2006.01)
*B26D 3/00* (2006.01)
*B26D 7/18* (2006.01)
*B29D 30/00* (2006.01)

(52) U.S. Cl.
CPC .............. *B29D 30/42* (2013.01); *B29D 30/46* (2013.01); *B29D 2030/0038* (2013.01); *B29D 2030/427* (2013.01)

(58) Field of Classification Search
CPC .... B29D 2030/4468; B29D 2030/0038; B29D 2030/427; B29D 2030/4406; B29D 2030/4412; B29D 2030/4475; B29D 2030/4481; B29D 2030/4487; B29D 2030/421; B29D 2030/422; B29D 2030/423; B29D 2030/424; B29D 2030/425; B29D 2030/426
USPC ....................................... 156/394.1, 906, 907
See application file for complete search history.

(56) References Cited

U.S. PATENT DOCUMENTS

| 2004/0011454 A1* | 1/2004 | Mancini ............. B29D 30/3007 |
| | | 156/130 |
| 2004/0035271 A1 | 2/2004 | Downing |
| 2010/0071844 A1* | 3/2010 | Tatara .................... B29D 30/42 |
| | | 156/264 |

FOREIGN PATENT DOCUMENTS

| CN | 103619572 A | 3/2014 |
| EP | 0434404 | 6/1991 |
| EP | 0956940 | 11/1999 |
| EP | 1065043 | 1/2001 |
| EP | 1 837 135 A1 | 9/2007 |
| WO | 2002/000421 | 1/2002 |
| WO | 2012/172462 | 12/2012 |

OTHER PUBLICATIONS

International Preliminary Report on Patentability for PCT/US2016/016135 dated Aug. 17, 2017, 11 pgs.
First Office Action dated Oct. 24, 2018 from the China National Intellectual Property Administration for China Patent Application No. 201680008722.9, Chinese language with English translation (20 pp.).
International Search Report for PCT/US2016/016135 dated Jul. 22, 2016, 7 pgs.
Written Opinion for PCT/US2016/016135 dated Jul. 22, 2016, 9 pgs.

* cited by examiner

BELT FORMING SYSTEM

RELATED APPLICATIONS

The present patent document is a § 371 filing based on PCT Application Serial No. PCT/US2016/016135, filed Feb. 2, 2016 (and published as WO 2016/126684 A2 on Aug. 11, 2016), designating the United States and published in English, which claims the benefit of the filing date under 35 U.S.C. § 119(e) of Provisional U.S. Patent Application Ser. No. 62/112,991, filed Feb. 6, 2015. All of the foregoing applications are hereby incorporated by reference in their entirety.

PRIORITY CLAIM

This invention claims the benefit of priority of U.S. Provisional Application Ser. No. 62/112,991, entitled "Belt Forming System," filed Feb. 6, 2015, the disclosure of which is hereby incorporated by reference in its entirety.

BACKGROUND

The present embodiments relate generally to a system for manufacturing a tire belt.

Tire belt formation techniques may involve pulling multiple cords through an extrusion die. The extruder heats elastomeric material, such as rubber, and coats the cords traveling through the die. Cooling drums adjacent to the extruder act both to pull the cords through the die and cool the reinforced material before the cutting and splicing phase of production. After traveling through the cooling drums, the fiber reinforced material may be allowed to hang with some slack in order to remove some residual forces. The fiber reinforced material then may be drawn onto a cutting station. In most current systems, the cutting station includes a strip vacuum transfer, a cutter and an outfeed belt conveyor. The strip vacuum transfer advances the fiber reinforced strip and positions it on the outfeed belt conveyor so that the cutter may cut the fiber reinforced material. The outfeed belt conveyor then indexes a predetermined distance. The strip vacuum transfer again advances the strip onto the conveyor so that the cutter again cuts it. This process results in a continuous belt of fiber reinforced material with the reinforcing cords lying at some angle typically not parallel to the central axis of the belt. The angle of the cords with respect to the lengthwise direction of the belt is known in the art as a bias angle.

The cut sections of this material overlap one another on the outfeed belt conveyor by a predetermined distance. This overlap is generally known in the art as a splice. A uniform splice is needed to maintain proper material strength and quality. The outfeed belt conveyor is typically aligned at an angle relative to the fiber reinforced material entering the cutting station, such that after the splicing process, a continuous strip of material lays on the conveyor, comprised of fibers or cords oriented at a predetermined bias angle.

Tire manufacturers generally produce more than one product line of tire belts, and each may have a different desired bias angle. It is preferable for multiple product lines to be produced on the same equipment. Because the equipment upstream of the cutting station may not be easily movable, the orientation of the outfeed belt conveyor downstream from the cutting station generally must be adjusted when a different bias angle is desired. The outfeed belt conveyor generally communicates with downstream manufacturing and testing equipment, which is generally moved with the downstream portion of the outfeed belt conveyor.

BRIEF SUMMARY

A belt forming system, the belt forming system comprising an upstream conveyor, a downstream conveyor located downstream of the upstream conveyor, and a belt assembly system in communication with the upstream conveyor and the downstream conveyor. The belt assembly system may comprise an arm, an actuator for moving the arm, and a holding component coupled to the arm and adapted to move a strip section from the upstream conveyor to a desired position on the downstream conveyor such that the strip section is oriented at a predetermined angle.

In one embodiment, the upstream conveyor and the downstream conveyor run in substantially parallel directions. Further, the arm may be rotatable. The belt forming system may comprise a second actuator coupled to the holding component and adapted to move the holding component with respect to the arm. The arm may be rotatable with respect to the downstream conveyor, and the holding component may be rotatable with respect to the arm.

The belt forming system may comprise a belt cutter and an infeed conveyor, wherein the belt cutter is positioned at least partially in-between the infeed conveyor and the upstream conveyor. In another embodiment, the upstream conveyor, downstream conveyor, and infeed conveyor run in substantially parallel directions. The distance between the upstream conveyor and the downstream conveyor may be adjustable.

Other systems, methods, features, and advantages of the invention will be, or will become, apparent to one with skill in the art upon examination of the following figures and detailed description. It is intended that all such additional systems, methods, features, and advantages be within the scope of the invention, and be encompassed by the following claims.

BRIEF DESCRIPTION OF THE DRAWINGS

The invention can be better understood with reference to the following drawings and description. The components in the figures are not necessarily to scale. Emphasis instead is placed on illustrating the principles of the invention. Moreover, in the figures, like referenced numerals designate corresponding parts throughout the different views.

DETAILED DESCRIPTION OF THE DRAWINGS AND THE PRESENTLY PREFERRED EMBODIMENTS

Figure 1:
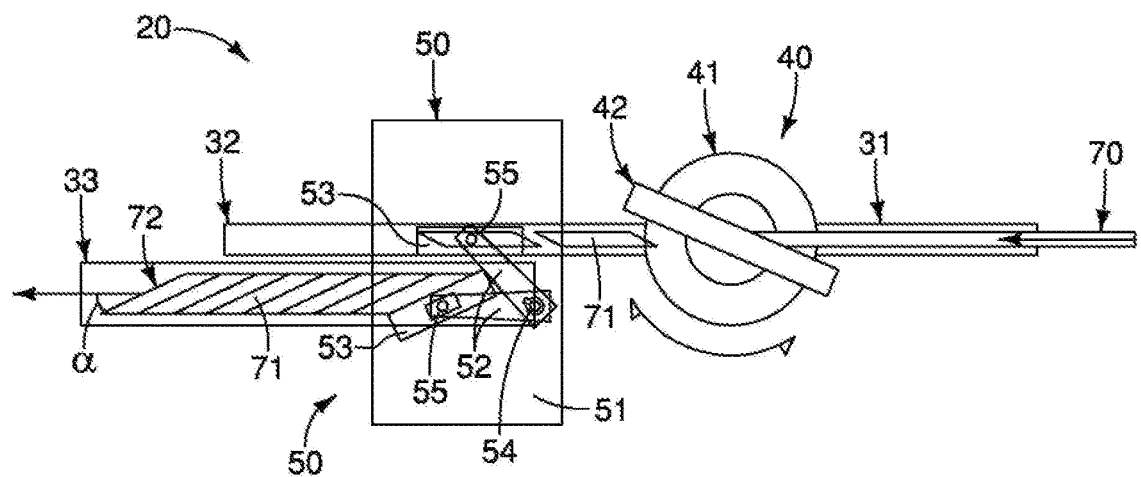
FIG. 1 is a schematic showing the top view of one embodiment of an exemplary belt forming system.

Referring to FIG. 1, belt forming system 20 is adapted to form a portion of a tire belt, depicted as bias belt 72, which is formed after cutting and positioning steps described below. Bias belt 72 is generally formed of an elastomeric material, such as rubber, and comprises a plurality of parallel cords, where the cords are oriented at an angle relative to the lengthwise direction of the belt equal to a bias angle $\alpha$. Belt forming system 20 may comprise a first conveyor 31, second conveyor 32, and third conveyor 33. In the described embodiments, a conveyor may be a belt conveyor, a strip vacuum transfer, or any other device adapted to move a rubber strip along an exemplary path, as depicted by conveyors 31, 32, 33. In the depicted embodiment, a belt cutting system 40 is positioned at least partially between first conveyor 31 and second conveyor 32. A belt assembly system 50 may be positioned at least partially between second conveyor 32 and third conveyor 33, and is preferably adapted to communicate with second conveyor 32 and third conveyor 33.

Rubber strip 70 is generally reinforced, and may be reinforced with a plurality of cords or fibers. It may have a plurality of steel cords running parallel to the lengthwise direction of rubber strip 70. Rubber strip 70 is typically formed by a process where uncured rubber is extruded around the plurality of steel cords, but any process may be utilized. After its formation, rubber strip 70 may be fed onto first conveyor 31. Rubber strip 70 is often tacky and relatively soft when it is fed onto first conveyor 31.

First conveyor 31 may serve as an infeed conveyor adapted to feed rubber strip 70 to belt cutting system 40 or otherwise move rubber strip 70 into communication with the belt cutting system 40, described in further detail below. Belt cutting system 40 is adapted to cut rubber strip 70. The cuts are preferably straight cuts oriented at a desired angle corresponding to the bias angle α, and preferably separate a strip section 71 from rubber strip 70. Strip section 71 then preferably moves onto second conveyor 32, which moves strip section 71 into communication with belt assembly system 50. Alternatively, as noted above, a device other than a conveyor adapted to move strip section 71 may be used.

Belt assembly system 50, described in detail below, preferably is adapted to move strip sections 71 from second conveyor 32 to third conveyor 33. Second conveyor 32 may be at least partially upstream of belt assembly system 50, and third conveyor 33 may be downstream of belt assembly system 50 and second conveyor 32. Belt assembly system 50 may rotate strip sections 71 such that they are properly oriented with respect to bias belt 72, and then place the properly-oriented strip sections 71 on third conveyor 33, as depicted in FIG. 1. Bias belt 72 comprises a plurality of strip sections 71, where the steel cords of each strip section 71 may be substantially parallel. The strip sections 71 overlap one another on third conveyor 32 by a predetermined distance, forming a uniform splice. The parallel steel cords of each strip section 71 are preferably oriented at bias angle α with respect to a lengthwise direction of bias belt 72. After each splice is formed, an additional strip section 71 becomes a portion of bias belt 72. Third conveyor 33 may be adapted to move in a direction substantially parallel to the lengthwise-direction of bias belt 72, and may move bias belt 72 to communicate with downstream equipment.

Figure 2:
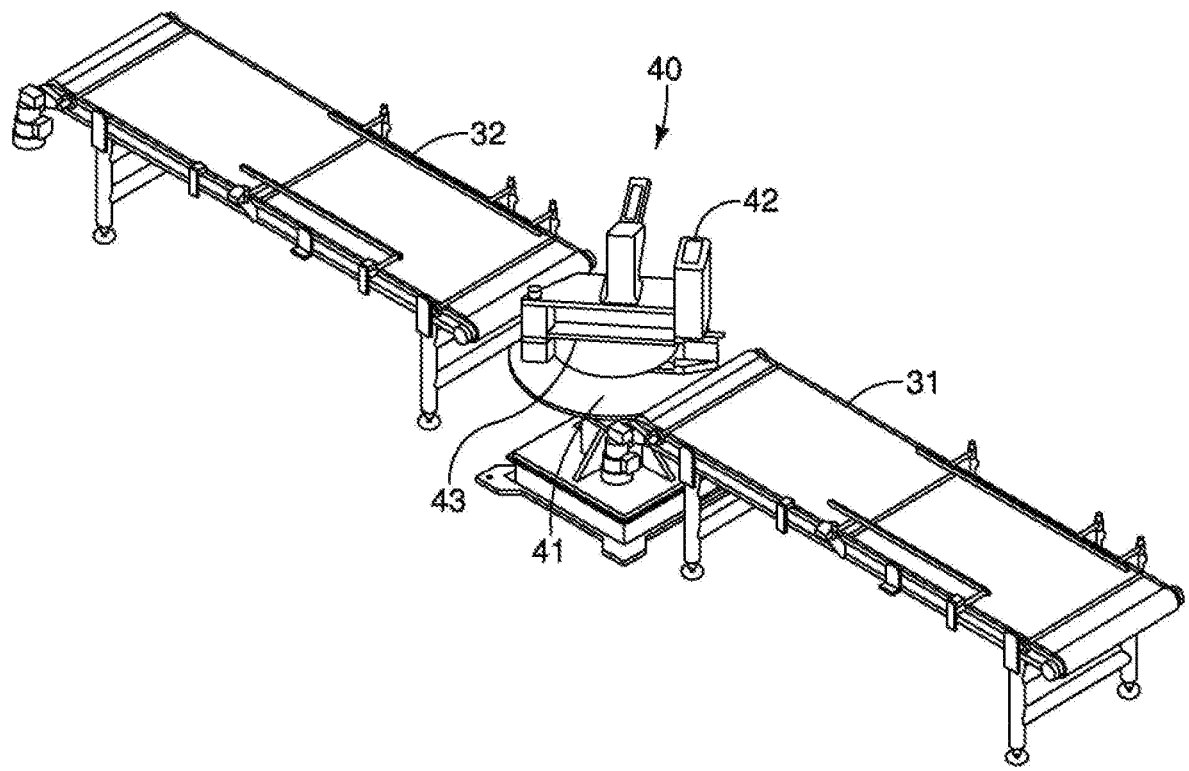
FIG. 2 is a perspective view of an exemplary first conveyor, belt cutting system, and second conveyor.

Belt cutting system 40 comprises a base 41 and a belt cutter 42. Belt cutter 42 preferably comprises a knife or blade 43 for cutting through rubber strip 70. As depicted by FIG. 2, belt cutter 42 may be embodied as a guillotine-style cutter, where a sharp knife or blade 43 approaches rubber strip 70 (see FIG. 1) from above and continues with a downward force for cutting through rubber strip 70, thereby separating rubber strip 70 into at least two portions. Any other device for cutting a reinforced rubber strip may be used. Referring to FIG. 1, belt cutter 42 is preferably adapted to cut rubber strip 70 at an angle relative to the lengthwise direction of rubber strip 70, and preferably an angle corresponding to a preferred bias angle α.

In the current embodiment, the belt cutting system 40 comprises rotatable components or is otherwise adjustable such that it can cut rubber strip 70 at multiple angles corresponding to multiple bias angles α. Referring to FIG. 2, base 41 preferably supports belt cutter 42. Belt cutter 42 may be adjusted relative to first conveyor 31 and second conveyor 32, and may be capable of rotating independent of, and relative to, first conveyor 31 and second conveyor 32. The rotation of belt cutter 42 may be accomplished through a manual adjustment by an operator, automatically through the use of an automatic actuation system, or by any other device adapted for rotating belt cutter 42. The present embodiment is advantageous, as rotating belt cutter 42 independent of first conveyor 31 and second conveyor 32 allows for cutting rubber strip 70 at different angles without adjusting the position or orientation of either first conveyor 31 or second conveyor 32.

Referring to FIG. 1, rubber strip 70 is cut by the belt cutter 42, thereby forming at least one strip section 71. Preferably, one strip section 71 is formed with one cut by belt cutter 42. After the cut, strip section 71 is moved forward to second conveyor 32. Rubber strip 70 is then fed forward through the belt cutter 42, where it again cuts rubber strip 70 to form another strip section 71.

In one embodiment, depicted in FIGS. 1-2, strip sections 71 and rubber strip 70 are moved forward through the use of the first and second conveyors 31, 32. When in communication with the belt cutter 40 immediately after a cut, strip section 71 may not be directly adjacent to a conveyor. In some embodiments, strip section 71 may be pushed forward to second conveyor 32 by the upstream, moving rubber strip 70, which is in communication with first conveyor 31. In other embodiments, belt forming system 20 may include additional equipment adapted to move strip section 71 forward. For example, belt forming system 20 may comprise a moveable vacuum ram adapted to lift the strip and place it on the second conveyor 32. Further, the vacuum ram may engage with the rubber strip 70 before the cut to assist with advancing rubber strip 70 for proper engagement with belt cutter 42 (e.g., advancing rubber strip 70 under a guillotine-style knife or blade 43). It may be preferable for either first and second conveyors 31, 32 to move at rates relative to each other such that strip sections 71 are precisely indexed (i.e., spaced apart) on second conveyor 32 for proper communication with belt assembly system 50. Alternatively, a device, which may be a vacuum ram, may be adapted to precisely index the strip sections 71.

After advancing onto second conveyor 32, strip section 71 moves into engagement with belt assembly system 50. Belt assembly system 50 is adapted to assemble bias belt 72 by moving and properly orienting strip sections 71 on third conveyor 33. Belt assembly system 50 may place at least two strip sections 71 on third conveyor 33 such that their edges overlap by a predetermined distance, thereby forming a splice.

Figures 3, 4:
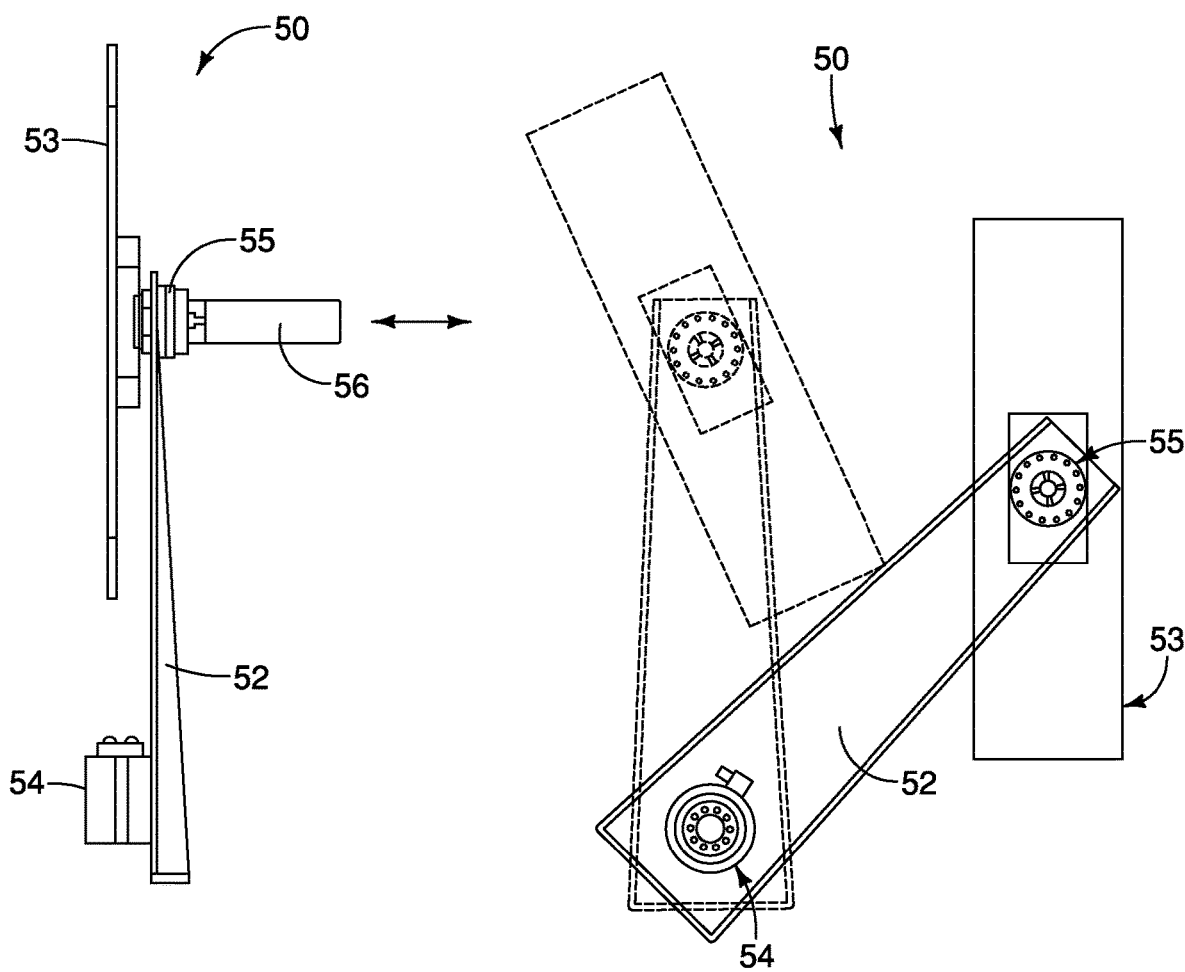
FIG. 3 is a side view of one embodiment of a belt assembly system.
FIG. 4 is a top view of the belt assembly system shown in FIG. 3.

FIGS. 3-4 depict one embodiment of belt assembly system 50, where belt assembly system 50 comprises arm 52, holding component 53, base rotary actuator 54, and orientation rotary actuator 55. Referring to FIGS. 1, 3 and 4, in one embodiment, rotary actuator 55 may be adjusted either manually or automatically such that it rotates each strip section 71 a preferred amount corresponding to the bias angle α. Holding component 53 generally comprises equipment for holding or gripping strip section 71, and may comprise a vacuum platen, a lifting magnet, a chuck, or any other suitable device. In one embodiment, holding component 53 comprises vacuum tooling adapted to pick up strip section 71 off of second conveyor 32. Base rotary actuator 54, which is coupled to arm 52 and a base 51 (see FIGS. 1 and 4), then rotates arm 52 such that holding component 53 is oriented over third conveyor 33. Orientation rotary actuator 55 rotates such that strip section 71 is properly oriented relative to third conveyor 33 and with respect to the desired bias angle α. Strip section 71 is then placed on third conveyor 33. It is preferred that strip section 71 is placed such that its edge parallel to the cords slightly overlaps a second strip section 71, ensuring that the two strip sections 71 are desirably spliced. If needed, bias system 50 may include sensors and robotic or other manufacturing technology to actively correct for position errors.

Alternatively, the step of properly orienting strip section 71 with respect to bias belt 72 may be accomplished by managing the distance between second conveyor 32 and third conveyor 33. In this embodiment, the distance between second conveyor 32 and third conveyor 33 corresponds with a desired bias angle α. For example, a larger distance between the two conveyors requires arm 52 to cover a greater angular distance when moving holding component 53 from a position over second conveyor 32 to a position over third conveyor 33. This embodiment may not require an orientation rotary actuator 55, as the orientation of holding component 53 may not need adjustment for different bias angles α, or may need adjustment only during setup.

Referring to FIG. 3, belt assembly system 50 may also comprise a thrusting device 56. Thrusting device 56 provides the vertical motion to lift the strip section 71 off of second conveyor 32 and also lower the strip section 71 onto third conveyor 33. Thrusting device 56 may be a pneumatic thruster, another type of linear actuator, or any other device adapted to apply a linear force on strip section 71. Thrusting device 56 may also apply a downward force on at least one strip section 71 after it is placed adjacent to at least one other strip section 71 to ensure a desirable splice. A plurality of spliced strip sections 71 form bias belt 72. Bias belt 72 may be moved by third conveyor 32 to downstream equipment.

In the current embodiment, for all desired bias angles α, third conveyor 33 runs substantially parallel to second conveyor 32 and first conveyor 31. The three conveyors may additionally run substantially parallel to the direction of incoming rubber strip 70. Further, rubber strip 70 runs substantially parallel to bias belt 72. This is advantageous, as substantially parallel equipment minimizes required floor space and eliminates awkwardly-shaped equipment, which can be difficult to place on a plant floor. Because the conveyors may not need to be adjusted relative to each other, particularly angularly relative to one another, they may additionally provide ideal locations for testing and inspection equipment that is preferably not moved or reoriented each time bias angle α is changed. One or more of the conveyors may also be more robust and may be substantially immovable and/or bolted to the floor since they do not need substantially reoriented or adjusted for the production of bias belts 72 with different bias angles α.

The described embodiments are further advantageous because the cutting operation is separated from the splicing operation. The separation of these two operations allows for the separation of conveyors and other equipment from belt cutter 42, thereby allowing the belt cutter 42 and its components (e.g., the knife or blade) to be robust. Because rubber strip 70 is generally reinforced with high-strength steel cords, smaller blades used in previously-known systems have difficulty penetrating rubber strip 70, which can reduce the quality of the cuts. Smaller blades also may wear out quickly and require maintenance or replacement often. Using a robust belt cutter 42 helps overcome these issues. Further, a large, robust knife or blade 43 may allow for a longer cut length than can be achieved by previously-known equipment.

Additionally, the separation of the cutting and splicing equipment allows for simple adjustment of bias angle α.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

The invention claimed is:

1. A belt forming system, the belt forming system comprising:
   an upstream conveyor having a working area extending in a first plane;
   a downstream conveyor located downstream of the upstream conveyor, wherein an entirety of a working area of the downstream conveyor is in the first plane or a second plane that is parallel to the first plane; and
   a belt assembly system in communication with the upstream conveyor and the downstream conveyor, the belt assembly system comprising:
      an arm that is rotatable with respect to at least one of the upstream conveyor and the downstream conveyor during a belt forming process;
      an actuator for rotating the arm; and
      a holding component adapted to engage a strip section located on the upstream conveyor to remove the strip section from the upstream conveyor and place the strip section at a desired position on the downstream conveyor such that the strip section is oriented at a predetermined angle on the downstream conveyor,
   wherein the upstream conveyor and the downstream conveyor are offset, run in the same direction, and are parallel, and
   wherein a length of the upstream conveyor at an end of the upstream conveyor extends along a length of the downstream conveyor.

2. The belt forming system of claim 1, where the belt assembly system further comprises a second actuator coupled to the holding component and adapted to move the holding component with respect to the arm.

3. The belt forming system of claim 2, wherein the holding component is mounted to an end of the arm opposite a first actuator for rotating the arm, and wherein the holding component is rotatable with respect to the arm.

4. The belt forming system of claim 1 further comprising a belt cutter and an infeed conveyor, wherein the belt cutter is positioned at least partially in-between the infeed conveyor and the upstream conveyor.

5. The belt forming system of claim 4, wherein the upstream conveyor, downstream conveyor, and infeed conveyor run in substantially parallel directions.

6. The belt forming system of claim 1, wherein the distance between the upstream conveyor and the downstream conveyor is adjustable.

7. A belt forming system, the belt forming system comprising:
   a first conveyor having a working area extending in a first plane;
   a second conveyor located downstream from the first conveyor, wherein an entirety of a working area of the second conveyor is in the first plane or a second plane that is parallel to the first plane, and wherein the first conveyor and the second conveyor are offset, run in the same direction, and are parallel;

a belt cutting system adapted to cut a strip section from a strip, the belt cutting system positioned at least partially in-between the first conveyor and the second conveyor, wherein the belt cutting system comprises a belt cutter that is rotatable independent of, and with respect to, the first conveyor and the second conveyor;

an arm that is rotatable with respect to at least one of the first conveyor and the second conveyor during a belt forming process via a first actuator, the arm being adapted to move the strip section from the second conveyor to a third conveyor that is parallel to the second conveyor and offset relative to the second conveyor; and a holding component, wherein the holding component is mounted to an end of the arm and is rotatable relative to the arm opposite the first actuator, wherein a downstream end of the second conveyor extends along an upstream end of the third conveyor.

8. The belt forming system of claim 7, wherein the first conveyor and the second conveyor run in substantially parallel directions.

9. The belt forming system of claim 7, wherein the belt cutter comprises a guillotine-style knife or blade.

10. The belt forming system of claim 7, wherein the first conveyor, second conveyor, and third conveyor run in substantially parallel directions.

11. The belt forming system of claim 7, wherein the belt forming system further comprises a second actuator coupled to the holding component and adapted to move the holding component with respect to the arm.

12. The belt forming system of claim 7, wherein the distance between the second conveyor and the third conveyor is adjustable.

13. The belt forming system of claim 1, wherein the holding component is adapted to move the strip section from the length of the upstream conveyor to the length of the downstream conveyor.

14. The belt forming system of claim 7, wherein the arm is adapted to move the strip section from the downstream end of the second conveyor to the upstream end of the third conveyor.

* * * * *